United States Patent [19]

Douglas

[11] 3,861,646

[45] Jan. 21, 1975

[54] DUAL SEALING ELEMENT VALVE FOR OIL WELL PUMPS

[75] Inventor: Bobby L. Douglas, Odessa, Tex.

[73] Assignee: Dresser Industries, Inc., Dallas, Tex.

[22] Filed: Oct. 27, 1972

[21] Appl. No.: 301,557

[52] U.S. Cl................ 251/356, 264/267, 251/357, 251/332
[51] Int. Cl............................................ F16k 1/44
[58] Field of Search .......... 251/356, 357, 358, 360, 251/361, 362, 363, 364, 365, 129, 141, 332, 333; 137/434, 14.5, 625.65; 85/9; 264/267

[56] References Cited
UNITED STATES PATENTS

| | | | |
|---|---|---|---|
| 713,052 | 11/1902 | Bordo et al.......................... | 137/375 |
| 2,414,577 | 1/1947 | Adair et al.......................... | 137/434 |
| 2,516,947 | 8/1950 | Blevans.............................. | 251/315 |
| 2,568,274 | 9/1951 | Clark................................. | 264/267 X |
| 2,659,566 | 11/1953 | Rand................................. | 251/358 X |
| 2,677,149 | 5/1954 | Fineran............................. | 264/267 X |
| 2,704,650 | 3/1955 | Rand................................. | 251/333 X |
| 2,720,219 | 10/1955 | Grove et al......................... | 251/357 X |
| 2,995,057 | 8/1961 | Nenzell............................. | 251/332 X |
| 3,240,379 | 3/1966 | Bremer et al. .............. | 151/14.5 UX |
| 3,293,342 | 12/1966 | Grove................................ | 264/267 |
| 3,326,521 | 6/1967 | Murray.............................. | 251/358 |
| 3,356,104 | 12/1967 | Canalizo........................ | 137/516.29 |
| 3,379,214 | 4/1968 | Weinberg............................ | 251/141 |
| 3,381,351 | 5/1968 | Szwargulski ................... | 251/358 X |
| 3,381,352 | 5/1968 | Lindner et al. ................. | 251/358 X |
| 3,459,404 | 8/1969 | Wisniewski........................ | 251/141 |
| 3,581,365 | 6/1971 | Murray .......................... | 29/157.1 R |

*Primary Examiner*—Henry T. Klinksiek
*Attorney, Agent, or Firm*—Michael J. Caddell; William E. Johnson, Jr.

[57] ABSTRACT

A valve body is fabricated by injecting rubber through a channel extending along the central longitudinal axis of a cylindrical body having a conical-shaped end portion and out through a pair of transverse channels to form a flexible resilient sealing surface having a flexible lip, the resilient sealing surface being formed at a slightly greater angle than the adjacent metal frusto-conical sealing surface on the body. The central and transverse channels used for injecting the rubber serve as a mechanical lock between the resilient sealing surface and the metal body of the valve. In addition, the resilient sealing surface is chemically bonded to the metal body of the valve. A plastic valve guide having a continuous ring on one end and a centrally oriented guide portion having three arcuate surfaces equally spaced around the circumference of the valve body are arranged such that the valve body can move longitudinally within the valve guide.

6 Claims, 12 Drawing Figures

DUAL SEALING ELEMENT VALVE FOR OIL WELL PUMPS

BACKGROUND OF THE INVENTION

This invention relates generally to valves, and in particular, to dual sealing element valves useful in oil well pumps.

It is well known in the oil well pumping art to use a valve having multiple sealing elements, for example, as illustrated and described with respect to U.S. Pat. No. 2,745,631 to R. K. Shellman and to U.S. Pat. No. 3,419,041 to E. R. Jennings. With such prior art valves, it is known to provide a metal sealing element in combination with a resilient sealing element. However, the resilient sealing element characteristically comprises an O-ring or some other such annular device which is merely assembled within the valve structure but which has neither a good chemical bond nor a good mechanical bond to the valve itself.

It is therefore the primary object of the present invention to provide a new and improved dual sealing element valve having an improved chemical bond between the valve body and the resilient sealing element;

It is also an object of the invention to provide a new and improved dual sealing element valve having an improved mechanical bond between the resilient sealing element and the valve body; and It is yet another object of the invention to provide a new and improved method for manufacturing a multiple sealing element valve assembly.

SUMMARY OF THE INVENTION

The objects of the invention are accomplished, generally, by a valve apparatus and method of making same wherein at least one resilient sealing element is injection molded and mechanically and chemically locked into a dual sealing relationship with a non-resilient sealing element on the apparatus.

These and other objects, features and advantages of the present invention will be more readily appreciated from a reading of the following detailed specification and drawing, in which.

Figure 1:
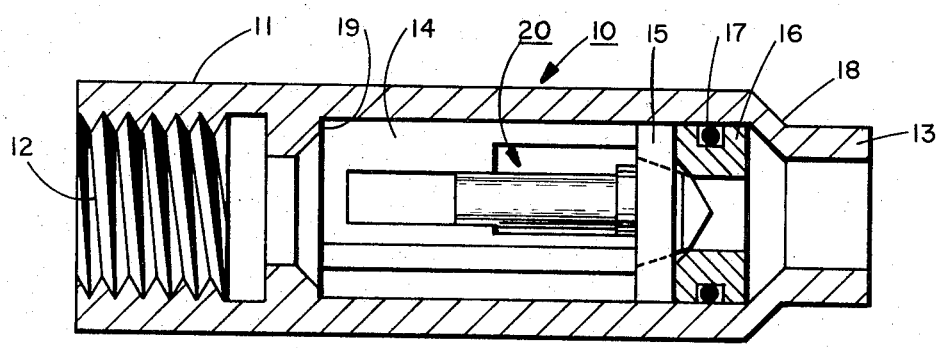
FIG. 1 illustrates, partly in cross section, a view of the valve assembly according to the present invention.
Figure 2:
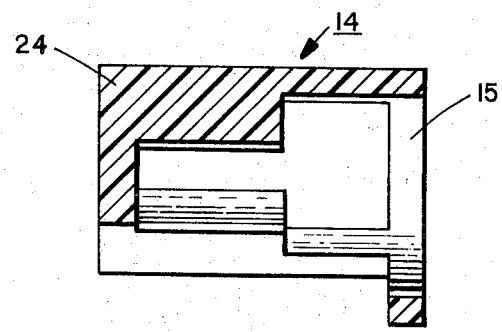
FIG. 2 illustrates, partly in cross section, a valve guide according to the present invention taken along the section lines A-A of the view of FIG. 3.
Figure 3:
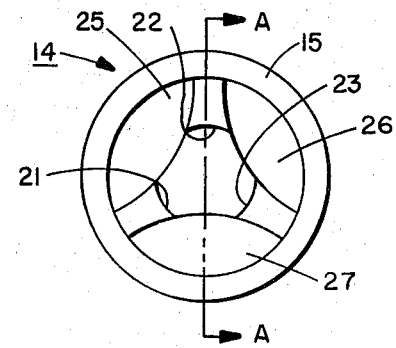
FIG. 3 is a pictorial end view of the valve guide illustrated in FIG. 2.

Referring now to the drawing in more detail, especially to FIG. 1, there is illustrated a valve assembly 10 according to the present invention having a tubular housing 11 with internal threads 12 at one end and having no threads at its other end 13. A plastic valve guide 14, shown in more detail in FIGS. 2 and 3, is positioned internally in the housing 11 and is limited in movement along the longitudinal axis of the body 11 by a shoulder 19 in one direction and by a valve seat 16, shown in more detail in FIGS. 4 and 5, in the other direction. The valve seat 16 has an O-ring 17 providing a seal between the valve seat 16 and the housing 11. The seat 16 is restrained from movement along the longitudinal axis of the housing 11 by the crimp 18 put in the housing 11 during the fabrication of the overall assembly. A valve body 20, shown in more detail in FIGS. 6–9, is illustrated in FIG. 1 as being in place within the valve guide 14 and resting upon the seat 16. It should be appreciated that the valve assembly 10 can be used to replace the ball valve assembly in oil well pumps, for example, such as is illustrated and described in U.S. Pat. No. 3,689,206 to Robert B. Meripol, and assigned to the assignee of the present invention.

Referring now to FIGS. 2 and 3, the plastic valve guide 14 is a molded integral unit having a continuous ring 15 at one end having an external diameter substantially equal to the internal diameter of the housing 11 in FIG. 1. A center guide portion having three arcuate surfaces 21, 22 and 23 are part of an imaginary circle having a diameter substantially equal to the outside diameter of the valve body 20. The other end 24 of the valve guide 14 is substantially Y shaped, thus allowing fluid bypass through the openings 25, 26 and 27. The end 24 of the valve guide 14 contacts the shoulder 19 at the three extremities of the Y shaped configuration. It should be appreciated that FIG. 2 is a sectional view taken along the section lines A—A of the view illustrated in FIG. 3. Although the valve guide 14 can be formed of various plastics or other materials, the preferred embodiment contemplates that it be formed of 6/10 nylon with 60percent fiberglass filler.

Figure 4:
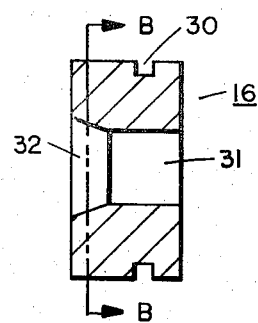
FIG. 4 is a view, partly in cross section, of a valve seat used in the valve assembly according to the present invention.
Figure 5:
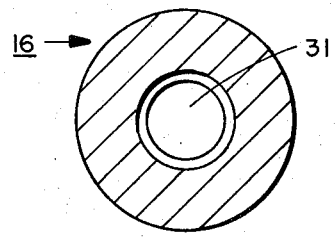
FIG. 5 is a view, partly in cross section, taken along the sectional lines B—B of the valve seat illustrated in FIG. 4.

Referring now to FIGS. 4 and 5, there is illustrated the valve seat 16 which is cylindrically shaped and preferably fabricated from stainless steel. A slot 30 is formed around a median portion of the circumference of valve seat 16 for placing the O-ring 17 therein as illustrated in FIG. 1. The seat 16 has a center fluid passageway 31 along its longitudinal axis with one end having a frusto-conical shaped opening 32 sized to receive and mate with the dual sealing faces of the valve body 20.

Figure 6:
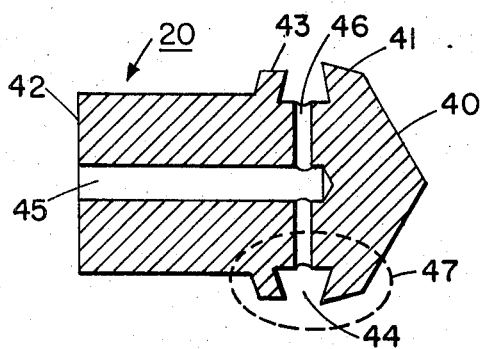
FIG. 6 is a view, partly in cross section, of the valve body according to the invention prior to the injection of the rubber sealing element.
Figure 7:
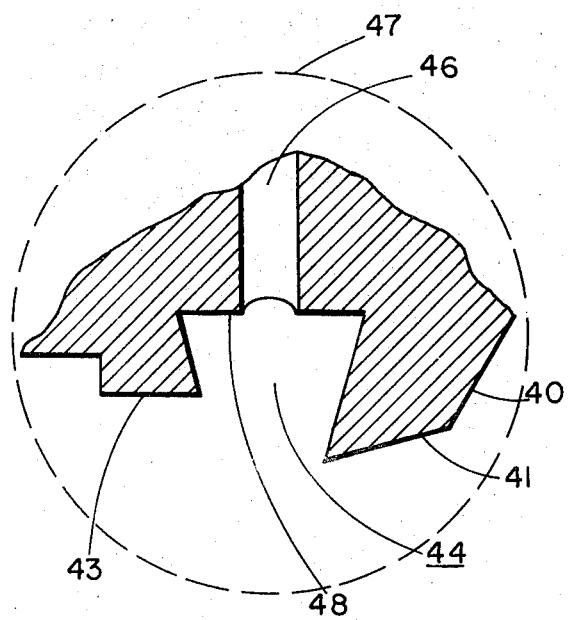
FIG. 7 is an expanded view of a portion of the valve body illustrated in FIG. 6.

Referring now to FIGS. 6 and 7, the valve body 20 is illustrated in greater detail. The valve body 20 is fabricated from a cylindrical section of stainless steel having a conical shaped end 40 with an intermediate frusto-conical section 41 sized to mate with a portion of the matching faces within the frusto-conical shaped portion 32 of the valve seat 16 illustrated in FIG. 4. The valve body 20 is substantially flat on its other end 42. A circular lip 43 is formed intermediate the end 42 and the frusto-conical surface 41 to define an encircling dovetail channel 44 around the circumference of the valve body 20. A passageway 45 connects the end 42 of the valve body 20 with a transverse passageway 46 in communication with the channel 44. Although the passageways 45 and 46 can be formed in various ways, the preferred embodiment contemplates that they are formed by drilling the passageway 45 with a ⅛ drill and the passageway 46 with a 1/16 drill, by way of example, when using a valve body 20 having an outside diameter of approximately ½ inch and a length of 1.25 inches. A portion of the valve body 20, shown by the dotted line 47, is shown in greater detail in FIG. 7.

Figure 8:
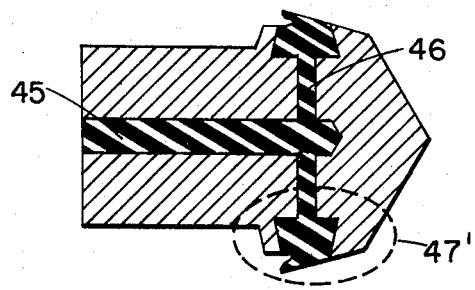
FIG. 8 is a cross-sectional view of the valve body according to the present invention after the resilient sealing element has been injected therein.
Figure 9:
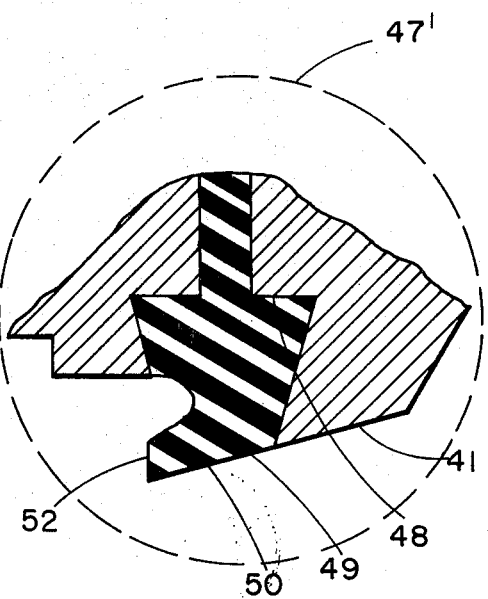
FIG. 9 is an expanded view of a portion of the valve body illustrated in FIG. 8.

Referring now to FIG. 7, the dovetail channel 44 is illustrated as being smaller at its mouth defined by the outer extremities of the lip 43 and the surface 41 than at its rear portion 48 for purposes of forming a mechanical lock of the injected rubber 49 illustrated in FIGS. 8 and 9.

Referring now to FIGS. 8 and 9, the channels 45 and 46 are illustrated as having injected rubber therein which is used for purposes of forming a rubber sealing element having a face 50 used in conjunction with the metal sealing face 41. The rubber sealing element also has a lip 52 which aids in the sealing action while in use with the valve assembly 10 illustrated in FIG. 1. It should be appreciated that while the metal face 41 and the rubber face 50 can be fabricated in the same plane, the preferred embodiment contemplates that the rubber face 50 be fabricated at a slightly larger angle from the longitudinal axis of the valve member 20 than is the angle of the metal face 41. It should also be appreciated that the dovetail channel 44, illustrated in an expanded version in FIG. 9 within the dotted line circle 47', has a diameter defined by the surface 48 which is slightly smaller than the outside diameter of the valve body 20.

Figure 10:
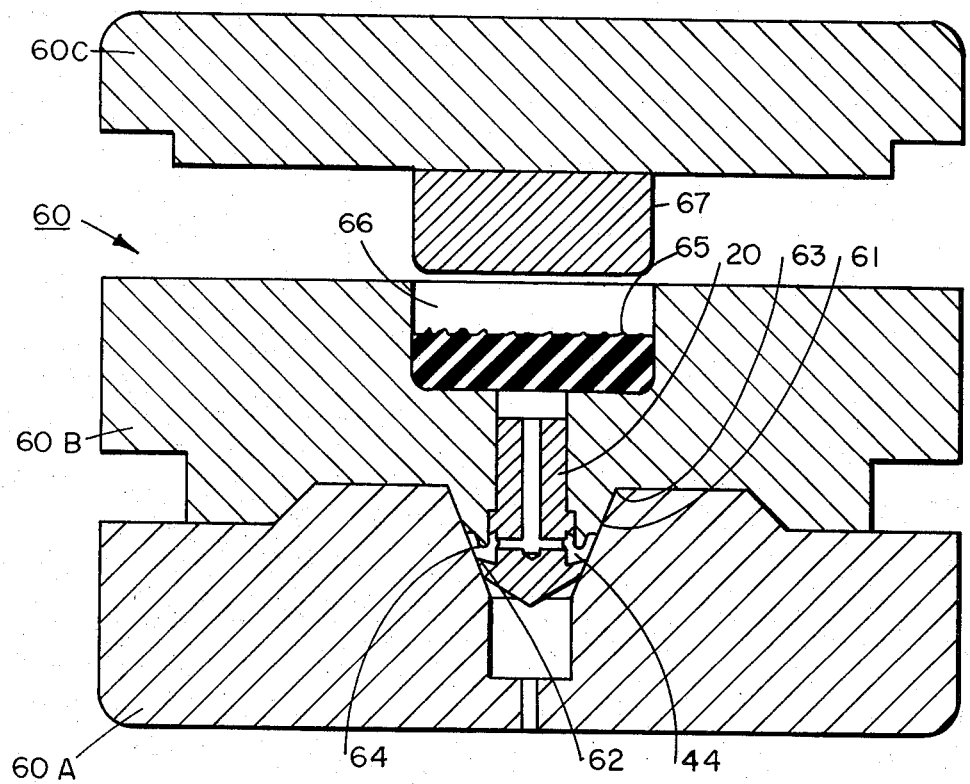
FIG. 10 is an illustration, partly in cross section, of a valve body according to the present invention within an open mold assembly used in injecting the resilient sealing element.

Referring now to FIG. 10, there is illustrated a mold for injecting the molten rubber through the channels 45 and 46 into the dovetail channel 44. The mold 60 is comprised of three parts, the part 60A having a frusto-conical opening 61 for receiving the frusto-conical face 41 and conical shaped end 40 of the valve body 20. The inner face of the opening 61 is sized to mate with the face 41 of the valve body 20 and between the points 62 and 63 is sized to have a slightly greater angle than the matching inner face with the face 41 on the valve body 20. This slightly greater angle between the mold 60A and the longitudinal axis of the valve body 20 thus causes the face 50 of the rubber sealing element 49 to be at a slightly greater angle than the angle of the face 41. By way of example, successful valves have been constructed where the metal face 41 is 20° from the longitudinal axis of the valve body and the resilient face 50 is 22 ½° from the same axis. After the valve body 20 is placed within the mold 60A, the mold part 60B is attached to the mold 60A in a manner to encircle the valve body 20 and has a protruding portion 64 which enables the lip 52 of the sealing element 49 to be fabricated during the injection molding process. A rubber load 65 is placed within a cylindrical cavity 66 in the mold part 60B in near proximity to the end 42 of the valve body 20 and the channel 45 therein. The mold part 60C has a cylindrical extension 67 sized to enter the cavity 66 and thus force the rubber load into the channel 45, the channel 46 and the dovetail channel 44.

Figure 11:
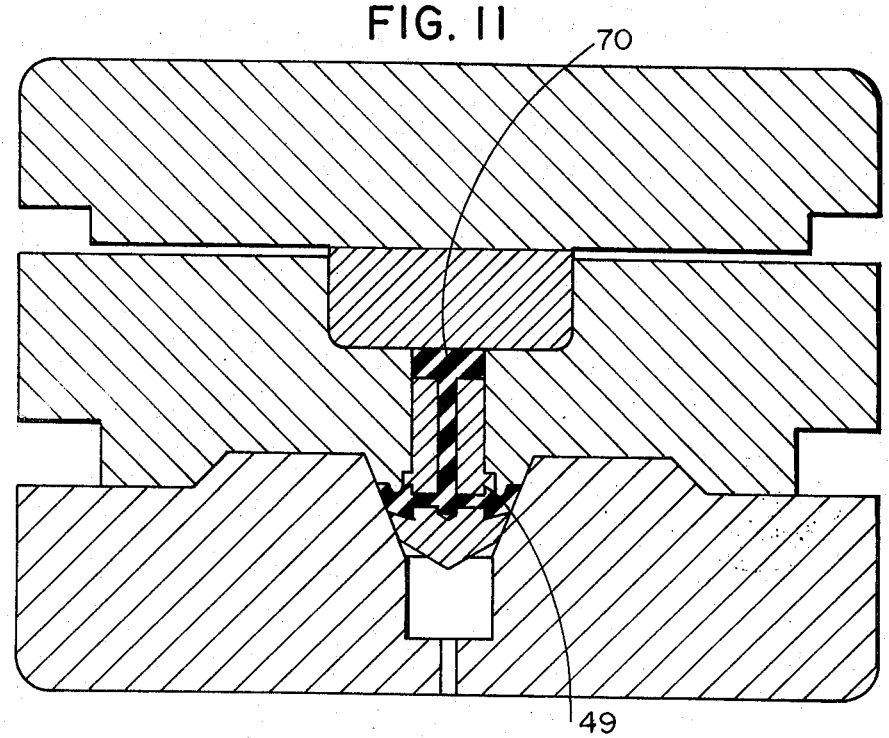
FIG. 11 illustrates the valve body according to the present invention within the closed mold and the injected rubber in place within the valve body.
Figure 12:
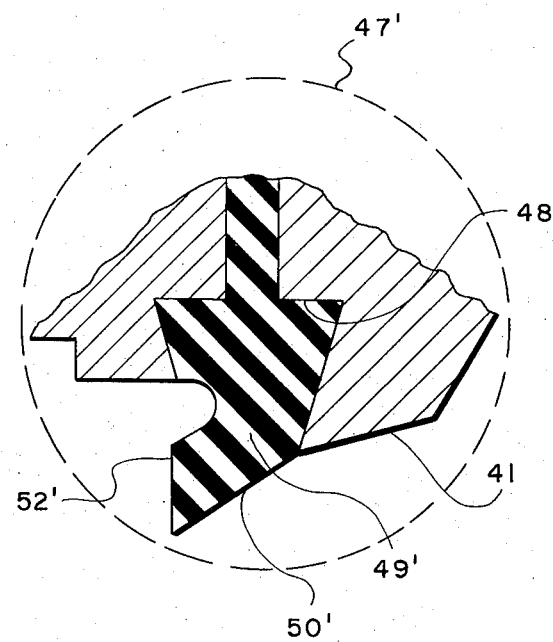
FIG. 12 illustrates an alternate expanded view of the sealing surfaces of the valve body of FIG. 8.

FIG. 11 illustrates the closing of the mold 60 and the injected rubber after it is forced through the channels 45 and 46 into the dovetail channel 44 to form the rubber sealing element 49.

During the fabrication of the finished dual sealing element valve, the valve body 20 is first machined from 440 A stainless steel. The channels 45 and 46 are drilled into the body 20 and then the machined body is heat treated to 50–55 Rockwell C hardness. The radiused seating surface 41 is polished to a 32 finish. The seating surface 41 is then masked and a hydraulic abrasive cleaning system using sand and water is used to clean the interior of the dovetail channel 44, after which the masking material is removed from the seating surface 41. A suitable adhesive is then applied with a brush to the interior of the channel 44 to prepare the channel for receiving the injected rubber. The valve body 20 is then placed within the molds 60A and 60B and a measured amount of rubber stock 65 is placed within the cavity 66 in the mold part 60B. The mold is then closed forcing the rubber stock through the channels 45 and 46 into the channel 44 to form the sealing face 50 and the lip 52 and is bonded to the interior of the channel 44. Following a vulcanization cycle of approximately 15 minutes, the valve is removed from the mold and the excess flash is trimmed from the lip sealing surface. It should be appreciated that the trailing edge 70 of the injected rubber usually breaks off when the mold is opened to result in the finished product as illustrated in FIG. 8.

In fabricating the assembly 10 illustrated in FIG. 1, the valve guide 14 is placed within the housing 11 against the shoulder 19 and the valve body 20 is then placed within the valve guide 14. The valve seat 16 is then placed in the housing 11 and the housing 11 crimped at the point 18 to maintain the guide 14 valve seat 16 and valve body 20 in place within the housing 11.

Thus, there has been illustrated and described herein the preferred embodiments of the valve assembly according to the present invention wherein a vastly improved dual sealing element valve is provided with vastly improved mechanical and chemical integrity. The flexible resilient lip 52 contacts the metel seat 16 first as the valve is closing due to the different angles of the resilient and metel sealing surfaces. The pressure behind the valve body forces the valve body further towards the seat until the metal sealing surface also contacts the seat. The pressure also expands the flexible lip and provides a good seal even over rough surfaces or sand particles. The channels 45 and 46 in conjunction with the dovetail nature of the sealing element 50 together provide a tremendous improvement in the mechanical integrity of the device, and the rubber sealing element is also chemically bonded to the valve body 20. It should be appreciated, however, that obvious modifications to the embodiments illustrated will occur to those in the art. For example, although the preferred embodiment contemplates that the channel 45 is drilled or formed along the central longitudinal axis of the body 20, the channel 45 could also be formed at an angle away from the longitudinal axis or alternatively could be formed along a line parallel to the central axis of the valve body. Furthermore, whereas the sealing face 41 has been illustrated as being on a different plane than the leading face 40 of the valve body 20, it should be appreciated that sealing face 41 and forward face 40 can be in the same plane.

The embodiments of the invention in which an exclusive property or privelege is claimed are defined as follows:

1. A valve apparatus, comprising:
   a valve body having an internal flow passageway therein, said passageway being at least partially filled with a resilient material; and
   a resilient sealing surface on said body, said surface being integral with said resilient material in said passageway;
   said passageway including a first channel which at least partially coincides with the central longitudinal axis of said valve body and at least one additional channel which runs transverse to said longitudinal axis;
   said valve body further comprising a dovetail channel around the circumference of said valve body and which is also filled with resilient material integral with said resilient material in said passageway, the exterior surface of said resilient material in said dovetail channel forming said resilient sealing surface.

2. The apparatus according to claim 1, wherein said resilient sealing surface is frusto-conical in shape.

3. The apparatus according to claim 2, including in addition thereto, a frusto-conical, non-resilient sealing surface in juxtaposition to said resilient sealing surface.

4. The apparatus according to claim 3 wherein the apex angle of the frusto-conical non-resilient sealing surface is less than the apex angle of the frusto-conical resilient sealing surface.

5. A valve member for use in a flow check valve, said valve member comprising:
   a rigid valve member body having a rigid frusto-conical sealing end and an elongated portion attached to said sealing end;
   a frusto-conical resilient sealing member abutting said sealing end and encircling said elongated portion;
   a circumferential channel formed in said valve member contiguous to said rigid sealing end; and,
   said resilient sealing surface is formed at a greater angle with the longitudinal axis of said elongated portion than the angle of said rigid sealing surface thereto.

6. The valve member of claim 5 wherein said resilient sealing means further comprises a circumferential lip formed thereon, said lip forming an annular extension of said resilient sealing surface; and said channel further comprises a dovetail channel having a wider channel bottom than the outer channel dimension.

* * * * *